United States Patent [19]

Biaggini et al.

[11] 4,073,394

[45] Feb. 14, 1978

[54] LIFT TRUCK WITH ATTACHMENT FOR CARRYING AUTOMOBILES

[75] Inventors: Benjamin F. Biaggini; Paul V. Garin, both of San Francisco, Calif.

[73] Assignee: Southern Pacific Transportation Company, San Francisco, Calif.

[21] Appl. No.: 646,941

[22] Filed: Jan. 6, 1976

[51] Int. Cl.² .................... G02F 3/81

[52] U.S. Cl. .................... 214/145 R; 214/16.1 CA; 214/750

[58] Field of Search .................... 214/145 R, 730, 731, 214/16.1 CA, 653, 750

[56] References Cited

U.S. PATENT DOCUMENTS

| | | | |
|---|---|---|---|
| 2,847,131 | 8/1958 | Miller | 214/16.1 CA |
| 2,956,701 | 10/1960 | Larson | 214/750 |
| 2,985,328 | 5/1961 | Fitch | 214/731 |
| 2,995,263 | 8/1961 | Fitch | 214/16.1 CA |
| 3,199,698 | 8/1965 | Schuster | 214/653 |
| 3,382,771 | 5/1968 | Nutter | 214/653 |

*Primary Examiner*—Frank E. Werner
*Assistant Examiner*—Ross Weaver
*Attorney, Agent, or Firm*—Phillips, Moore, Weissenberger, Lempio & Majestic

[57] ABSTRACT

A lift truck with two sets of elongated parallel tines. One set straddles the front wheels of an automobile and the other set straddles the rear wheels. The tines of each set are brought together to engage and cradle the front and rear of the bottom of each tire and the automobile is picked up by upward movement of the tines.

4 Claims, 6 Drawing Figures

LIFT TRUCK WITH ATTACHMENT FOR CARRYING AUTOMOBILES

BACKGROUND OF THE INVENTION

This invention relates to apparatus for elevating and moving automobiles.

One particular use for such apparatus is that more fully disclosed in the copending application of Benjamin F. Biaggini, William M. Jaekle, Paul V. Garin, Robert Byrne and Armand Giovanelli, Ser. No. 646,940, filed Jan. 6, 1976 and entitled "SIDE-LOADING TRANSPORT OF AUTOMOBILES BY RAIL", and assigned to the assignee of the present application, which application describes a method of loading and unloading automobiles into and from rail cars for rail transport of the automobiles. In such method automobiles are driven to alongside a rail car and are picked up and deposited on the decks of the rail car as the rail car is loaded. When the rail cars are unloaded at their destination, the automobiles are picked up from the rail car decks, moved outside of the rail car, lowered and deposited on the ground, after which they are driven away.

The principal object of the present invention is to provide an apparatus for such handling of automobiles that will not require any lifting attachments to be secured to the automobile, will not engage any portion of the automobile body and will be simple to operate.

SUMMARY OF THE INVENTION

The principal objects of the invention are provided by equipping a conventional lift truck with an attachment having spaced-apart pairs of elongated parallel tines. The tines are inserted below and crosswise to the automobile with the tines of one pair straddling the two front tires of the automobile and the tines of the other pair straddling the two rear tires. The tines of each pair are brought together to grip the front and back of the bottom of each tire, and the automobile is then picked up and transported by the cradled engagement of the tines with the tires.

Other objects and advantages will become apparent in the course of the following detailed description.

BRIEF DESCRIPTION OF THE DRAWINGS

In the drawings, forming a part of this application, and in which like parts are designated by like reference numerals throughout the same.

DESCRIPTION OF THE PREFERRED EMBODIMENT

Figure 1:
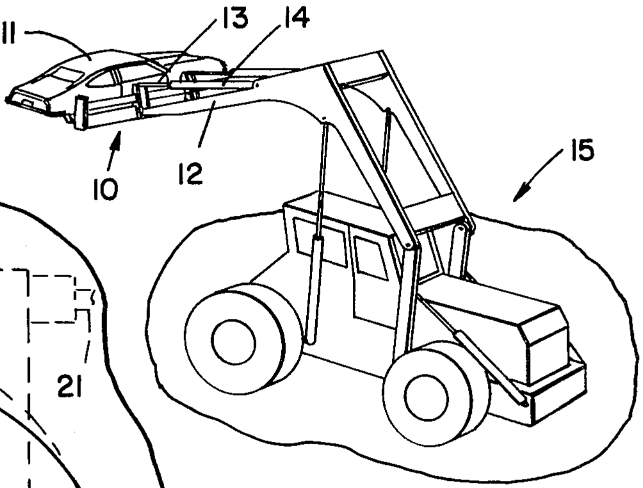
FIG. 1 is a perspective view of a lift truck with an attachment constructed in accordance with the invention, in use for lifting an automobile.

Referring now to the drawings, wherein is illustrated a preferred embodiment of the invention, the attachment 10, designed for the lifting and carrying of automobiles 11, is mounted on the lift arms 12 and the piston rods 13 of the hydraulic tilt jack 14 of a conventional lift truck 15.

The attachment 10 comprises an elongated carriage assembly having vertical end columns 16 and **16*a* and generally central vertical columns 17 and 17*a*, the latter columns having rearwardly extending flanges 18 to which the lift arms 12 and tilt jack rods 13 are secured. A front apron 19 extends the length of the carriage and is fastened to the vertical column to provide structural rigidity to the carriage. Both ends of the attachment 10** are essentially the same, and only one end will be described. Corresponding parts at the other end are indicated by the same reference numerals with the letter "*a*" appended thereto.

Horizontal guide rods 21 and 22 are secured to and extend between columns 16 and 17 at the top and bottom of the carriage. A pair of tine assemblies 23 and 24 are mounted on one end of the carriage, said tine assemblies 23 and 24 being "L"-shaped and having elongated horizontal tines 26 and 27 extending forwardly from the carriage parallel with each other and having a length greater than the width of an automobile, and having vertical arms 28. The vertical arms each have sleeves 29 and 30 welded to the top and bottom thereof which surround and slide on guide rods 21 and 22 respectively. A spacer pad 31 is carried on each tine 26 and 27 towards the rear thereof, the pad extending forwardly from the carriage sufficiently so that the pad will engage the tire 32 of automobile 11 and prevent the carriage from coming into contact with the side of the body of the automobile.

A hydraulic cylinder 36 fixed to the carriage centrally thereof has a piston rod 37 secured to the head end of hydraulic cylinder 38, whose piston rod 39 is secured to the vertical arm 28 of tine assembly 23. Hydraulic cylinder 41 is fixed to cylinder 38 and has its piston rod 42 secured to the vertical arm of tine assembly 24. By this arrangement actuation of cylinder 38 will move cylinders 38 and 41, and tines 26 and 27 in unison towards or away from the center of the carriage, and actuation of cylinders 38 and 41 will move tines 26 and 27 together or apart.

Figure 6:
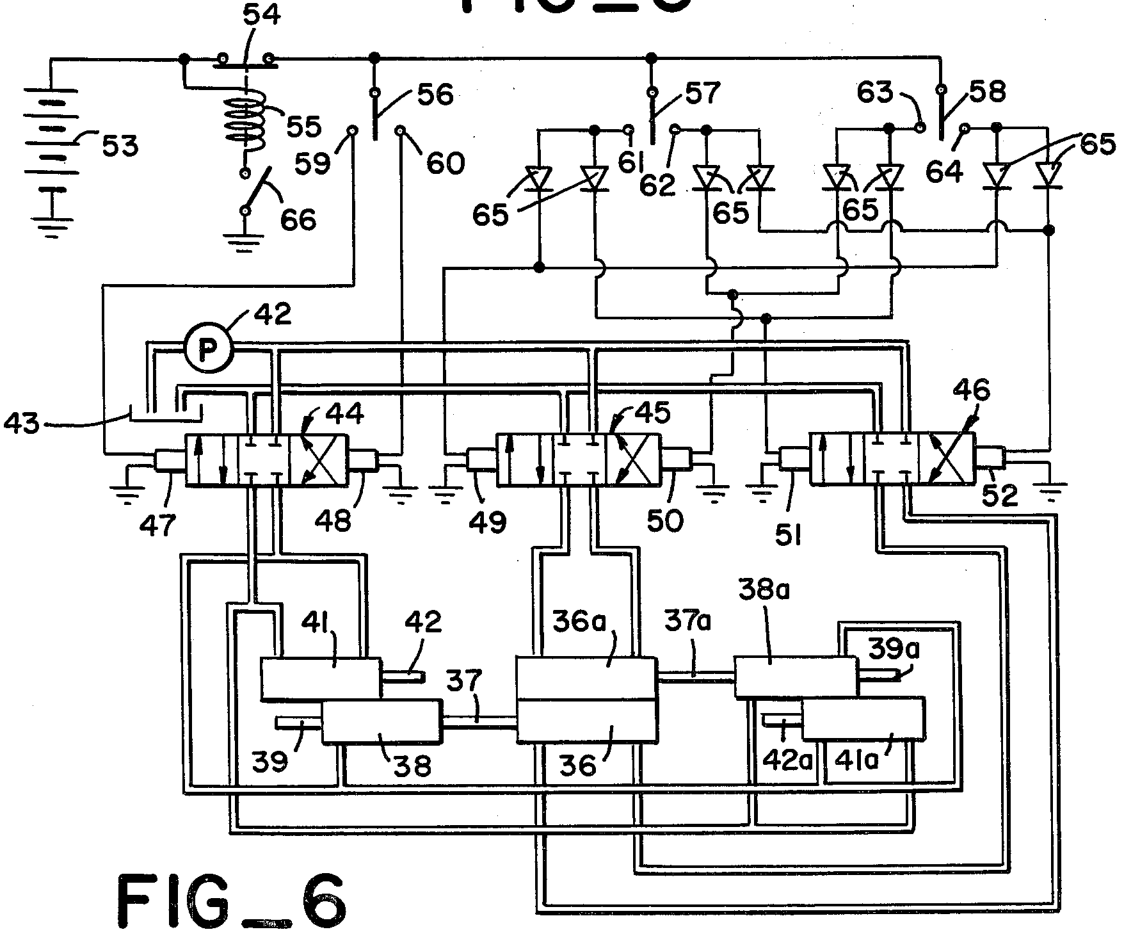
FIG. 6 is a schematic view of the control system for the attachment of FIG. 1.

The hydraulic and electrical control system for the various hydraulic cylinders is shown in FIG. 6. Pump 42 takes hydraulic fluid from sump 43 and supplies it under pressure to double-acting valves 44, 45 and 46, which valves are spring-biased to their illustrated center positions. Valve 44 has two solenoid actuators 47 and 48. When solenoid 47 is energized, pressure fluid is passed through valve 44 simultaneously to the rod ends of cylinders 38, 41, **38*a* and 41*a* while the head ends of those cylinders are exhausted through valve 44 to sump 43, to cause tines 26 and 27 to move in parallelism towards each other and also to cause tines 26*a* and 27*a* to move towards each other. Energization of solenoid 48 will cause valve 44** to move to a position reversing the pressurization of the cylinders to cause the tines in each set to spread apart by moving away from each other.

Energization of solenoid 49 will shift valve 45 to supply pressure fluid to the rod end of cylinder **36*a* to cause piston rod 37*a* to retract and move joined-together cylinders 38*a* and 41*a* towards the center of the carriage. Energization of solenoid 50 will shift valve 45 to reverse the fluid connections to cylinder 36*a* and thereby move cylinders 38*a* and 41*a* away from the center of the carriage. Similarly, energization of solenoid 51 will shift valve 46 to move cylinders 38 and 41** towards the carriage center while energization of solenoid 52 will cause opposite movement of cylinders 38 and 41.

Battery 53 supplies a positive voltage through normally-closed contacts 54 of relay 55 to double-throw control switches 56, 57 and 58. Switch 56, by engagement with contact 59 or 60, will cause solenoid 47 or 48, respectively, to be energized. Closure of switch 57 against contact 61 or 62 will cause solenoids 49 and 51 or solenoids 50 and 52, respectively, to be energized. Closure of switch 58 against contacts 63 or 64 will cause solenoids 50 and 51 or solenoids 49 and 52, respectively, to be energized. Diodes 65 are provided in the leads from the switch contacts to the solenoids for isolation purposes.

Figure 2:
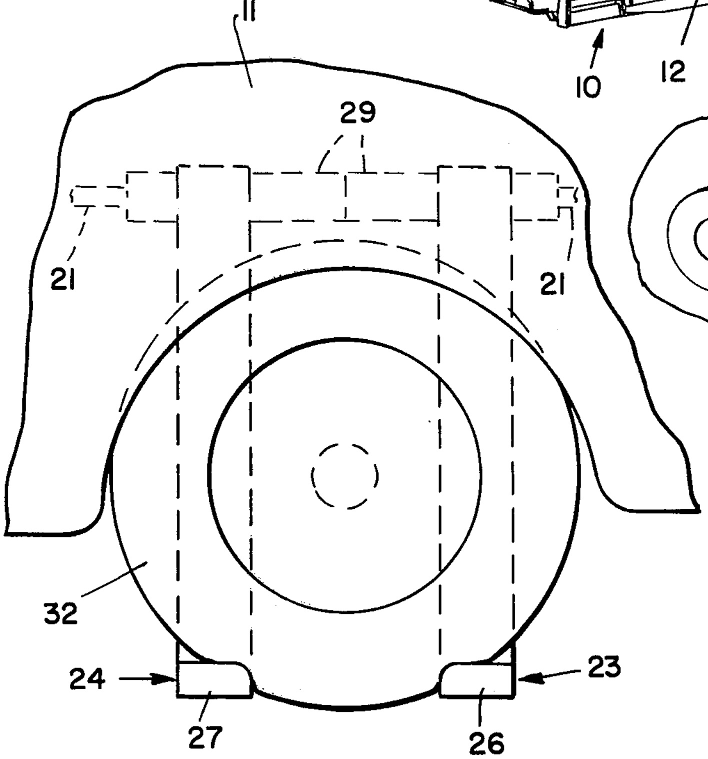
FIG. 2 is a partial and simplified front view of the tines engaging an automobile tire.
Figure 3:
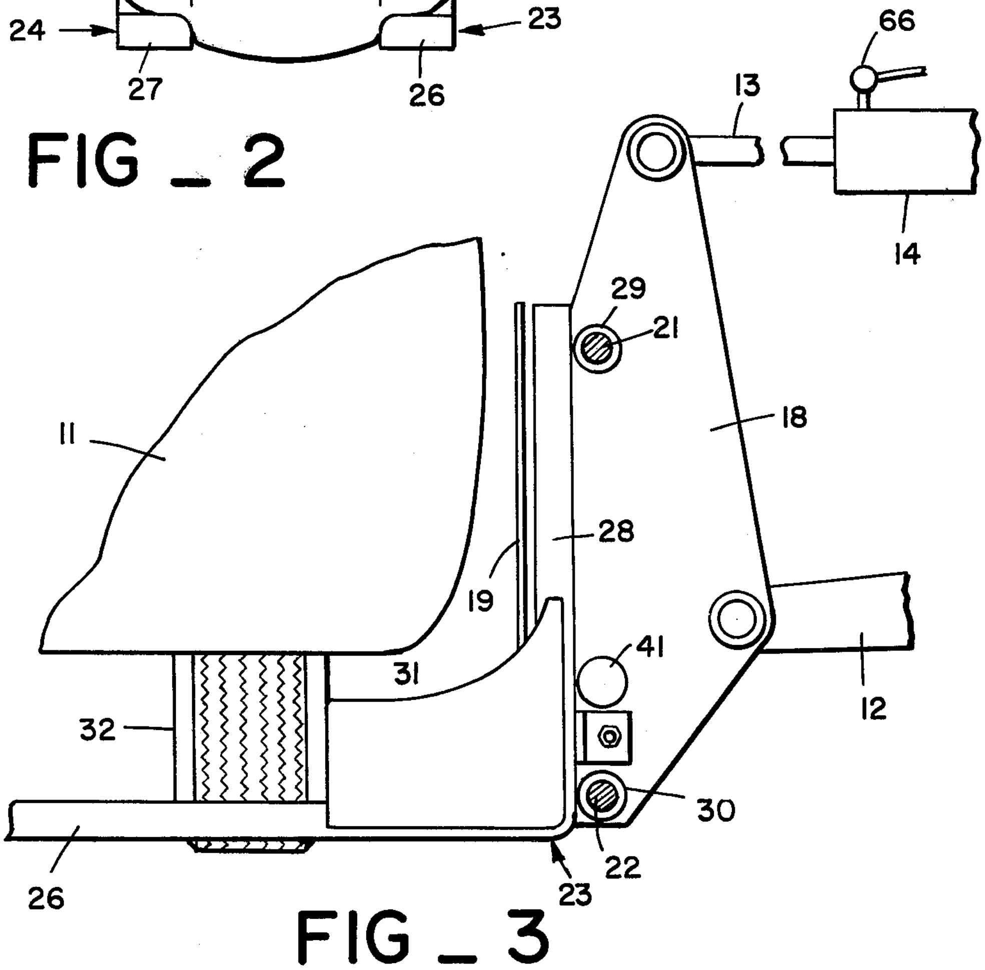
FIG. 3 is a sectional view, taken on line 3—3 of FIG. 4, of the attachment of FIG. 1.
Figure 4:
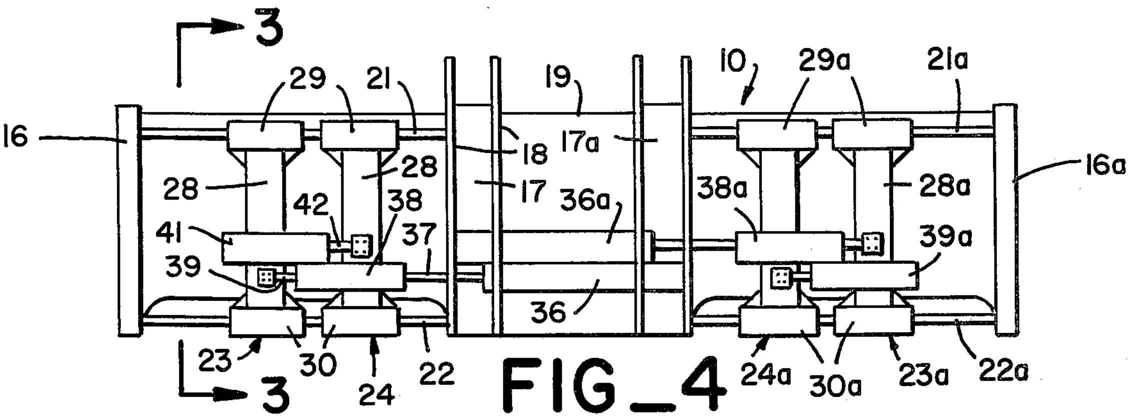
FIG. 4 is an elevational view of the rear of the attachment of FIG. 1.
Figure 5:
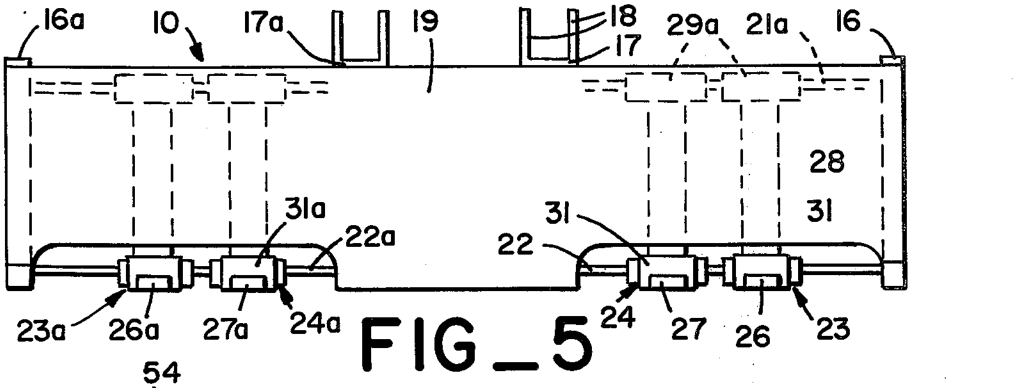
FIG. 5 is an elevational view of the front of the attachment of FIG. 1.

In operation, the lift truck operator will first actuate switch 57 to cause the two sets of tines 26–27 and **26*a*–27*a* to both move towards the carriage center or away therefrom to adjust the centers of the tine sets to the wheel base of the automobile to be picked up. The operator also closes switch 56 against contact 60 to spread the tines in each set. The operator then maneuvers the lift truck so that it approaches the side of the automobile with the tines straddling the tires of the automobile, and stops when the bumpers 31 engage the tires. The operator now closes switch 56 against contact 59 to move the tines into engagement with the front and rear of each tire, as shown in FIG. 2. The corners of the tines are preferably rounded where they engage the tires to prevent damage to the tires. A predetermined minimum spacing between the tines is provided by the fact that as the tines are brought together, sleeves 29 and 30 will come into abutment with each other when the desired minimum spacing has been reached and will thus prevent further closing movement. The preferred minimum spacing is as shown in FIG. 2**.

With the automobile tires cradled by the tines, the lift truck operator can now elevate the carriage by the conventional hoisting mechanism of the lift truck and move the automobile to its desired destination. The operator can then lower the carriage and set the automobile down. Switch 56 is manipulated to spread the tines in each set and the lift truck is then backed away from the automobile to withdraw the tines from thereunder.

In some instances, it may be desired to move the automobile a short distance forwardly or rearwardly after it has been set down. This may be done by manipulation of switch 58. Closure of this switch against contact 63 will cause tine set 26–27 to move towards the carriage center while tine set **26*a*–27*a* moves away from the center. That is, both tine sets move in unison and the same direction. Closure of switch 58** will move both tine sets in unison and in the opposite direction.

In order to prevent accidental actuation of any of the hydraulic cylinders during the time that an automobile is being carried in elevated position, electrical power is automatically removed from the switches 56, 57 and 58 during such time. One manner in which this may be accomplished is by providing a normally open pressure-actuated switch 66 connected to the tilt jack cylinder 14 so as to be actuated by the pressure of the fluid in the rod end of that cylinder. As the carriage and automobile is elevated, the pressure in the head end of the tilt jack cylinder will increase. Switch 66 is set such that it will close if the pressure in the tilt jack cylinder is above that which would be caused by the weight of attachment 10 alone. Thus, if an automobile has been picked up by the tines, the additional weight of the automobile will cause switch 66 to close. Closure of switch 66 will energize relay 55 to open relay contacts 54 and will prevent energization of any of the solenoids 47–52 until such time as the load on the tines is set down and the switch 66 reopens.

What is claimed is:

1. Apparatus for transporting automobiles comprising:

a. a lift truck having lift arms, b. an elongated carriage mounted on said lift truck arms for elevation thereby, c. first and second sets of elongated horizontal tines extending forwardly of said carriage, each set comprising two parallel tines, d. means mounting said tines on said carriage for horizontal movement of said tines along said carriage, e. means for fixing the centers of said tine sets relative to said carriage and including a first control therefor for moving the centers of the two sets of tines simultaneously along said carriage in equal and opposite directions from the center of said carriage and a second control for moving the centers of the two sets of tines simultaneously along said carriage in the same direction with a constant spacing between the centers of said sets of tines, said first and second controls being operable independently of each other, f. means including a third control therefor for moving both of the two tines of each set towards the center of the set and for moving both of them away from the center of the set while the centers of said sets are fixed relative to said carriage, said third control being operable independently of said first and second controls.

2. Apparatus for transporting automobiles comprising:

a. a lift truck having lift arms, b. an elongated carriage mounted on said lift truck arms for elevation thereby, c. first and second sets of elongated horizontal tines extending forwardly of said carriage, each set comprising two parallel tines, d. means mounting said tines on said carriage for horizontal movement of said tines along said carriage, e. a first pair of double-acting pressure-operated cylinders operatively associated with said first set of tines, said cylinders being fixed to each other, one of said cylinders having a piston connected to one of the tines of said first set and the other of said cylinders having a piston connected to the other of the tines of said first set, f. a second pair of double-acting pressure-operated cylinders operatively associated with said second set of tines, said cylinders being fixed to each other, one of said cylinders having a piston connected to one of the tines of said second set and the other of said cylinders having a piston connected to the other of the tines of said second set, g. a third pair of double-acting pressure-operated cylinders both fixed to said carriage, one of said third pair of cylinders having a piston connected to the cylinders of said first pair of cylinders and the other of said third pair of cylinders having a piston connected to the cylinders of said second pair of cylinders, h. means operatively associated with said first and second pairs of cylinders and including a first control therefor for moving said pistons of said first pair of cylinders simultaneously through equal distances and in opposite directions while at the same time also moving said pistons of said second pair of cylinders simultaneously through equal distances and in opposite directions, i. means operatively associated with said third pair of cylinders and including a second control for moving said pistons of said third pair of cylinders simultaneously through equal distances, said second control being operable independently of said first control.

3. Apparatus as set forth in claim 2 wherein said second control of means (i) includes first and second independently operable control members and includes means for moving said pistons through equal distances and in opposite directions in response to operation of said first control member and for moving said pistons through equal distances and in the same direction in response to operation of said second control member.

4. Apparatus as set forth in claim 3 and further including means responsive to the presence of a load carried by said tines for preventing operation of said first and second controls.

* * * * *